United States Patent
Mitate et al.

[11] Patent Number: 5,407,762
[45] Date of Patent: Apr. 18, 1995

[54] NON-AQUEOUS SECONDARY BATTERY

[75] Inventors: Takehito Mitate, Kitakatsuragi; Akimasa Umemoto, Kashihara; Tetsuya Yoneda, Nabari; Masaharu Yoshikawa, Kashihara, all of Japan

[73] Assignee: Sharp Kabushiki Kaisha, Osaka, Japan

[21] Appl. No.: 998,269

[22] Filed: Dec. 21, 1992

[30] Foreign Application Priority Data

Dec. 27, 1991 [JP] Japan .................. 3-345730

[51] Int. Cl.$^6$ .................. H01M 6/16; H01M 4/52
[52] U.S. Cl. .................. 429/197; 429/194; 429/217; 429/218
[58] Field of Search .................. H01M 4/52; 429/218, 429/194, 197, 217

[56] References Cited

U.S. PATENT DOCUMENTS 4,497,726  2/1985  Brule et al. .................. 252/182.3

FOREIGN PATENT DOCUMENTS 0421421  4/1991  European Pat. Off. .
0484187  5/1993  European Pat. Off. .

OTHER PUBLICATIONS

J. B. Goodenough et al, Japanese Laid–Open Patent Publication No. 55-136131, Laid open on Oct. 23, 1980 w/partial English translation.

Mizushiam et al: "$Li_xCoO_2$ (0 $_x$ 1): A New Cathode Material For Batteries of High Energy Density," *Mat. Res. Bull.*, vol. 15, pp. 783-789, 1980 (no month).

S. Oishi et al, Japanese Laid–Open Patent Publication No. 3-49155, Laid open on Mar. 1, 1991 with partial English translation.

A. Yoshino et al, Japanese Laid–Open Patent Publication No. 62-90863, Laid open on Apr. 25, 1987 with partial English translation.

*Primary Examiner*—John S. Maples
*Attorney, Agent, or Firm*—Nixon & Vanderhye

[57] ABSTRACT

A non-aqueous secondary battery of the present invention includes a positive electrode; a negative electrode containing lithium, and a non-aqueous ion-conductive material, wherein the positive electrode contains $Li_xCo_{1-y}Sb_yO_2$, where $0.05 \leq x \leq 1.1$, and $0.001 \leq y \leq 0.10$ as a positive electrode active material.

3 Claims, 1 Drawing Sheet

NON-AQUEOUS SECONDARY BATTERY

BACKGROUND OF THE INVENTION

1. Field of the Invention

The present invention relates to a non-aqueous secondary battery, and more particularly to a high voltage secondary battery in which a lithium/cobalt/antimony oxide is used as a positive electrode active material, whereby charge and discharge capacity is improved.

2. Description of the Related Art

With the miniaturization and power economization of electric devices and the like, secondary batteries using alkali metal such as lithium have been put into practical use. In the case where alkali metal alone such as lithium is used as a negative electrode, the following problems arise: Due to the repetition of charge and discharge cycles, i.e., the dissolution-deposition process of the alkali metal, the alkali metal deposits on an electrode surface to generate dendrites thereon. When the dendrites grow, they penetrate a separator in a battery to come into contact with a positive electrode, causing a short-circuit in the battery.

In order to overcome the above-mentioned problem, it is known that an alloy of alkali metal is used as a negative electrode in a secondary battery instead of alkali metal alone. In this case, the generation of dendrites can be decreased, compared with the case in which the alkali metal alone is used as a negative electrode, thereby improving charge and discharge cycle characteristics. However, the use of an alloy cannot completely prevent the generation of dendrites, and in some cases, a short-circuit is caused in a battery. In recent years, a battery having a negative electrode which uses an organic material such as carbon or a conductive polymer which inserts and deserts alkali metal ions, instead of the conventional electrode materials such as alkali metal or its alloy which utilizes a dissolution-deposition process or dissolution-deposition-diffusion-in-solid process, has been developed. As a result, the generation of dendrites caused in the case where alkali metal or its alloy is used can be prevented, whereby the problem of getting a short-circuit in the battery is substantially overcome.

On the other hand, as a positive electrode of a non-aqueous secondary battery, utilization of $V_2O_5$, $TiS_2$, $WO_3$, $MnO_2$, and the like had been attempted. However, these substances have a low discharge voltage of 2 to 3 V. In general, $LiCoO_2$ having a high discharge voltage is used (e.g., see Japanese Laid-Open Patent Publication No. 55-136131).

For example, K. Mizushima et al., *Mat. Res. Bull.*, 15, p. 783-789, (1980) shows a battery prepared by the following process. First, lithium carbonate and cobalt carbonate are mixed and sintered at 900° C. The resulting $LiCoO_2$ and lithium are respectively used as a positive electrode active material and a negative electrode in a propylene carbonate electrolyte solution of lithium fluoroborate. In this case, the discharge voltage is about 4 V.

However, when the $LiCoO_2$ is used, undesired side reactions occur, such as a decomposition of the solvent due to a high charge voltage of 4 V or more (e.g., see Japanese Laid-Open Patent Publication No. 3-49155) or a breakdown of an electrode due to the deintercalation of Li ions (e.g., see U.S. Pat. No. 4,497,726). Because of these side reactions, charge and discharge are conducted only within about one-third of theoretical capacity (assuming a one electron reaction, the theoretical capacity of $LiCoO_2$ is 274 mAh/g). For example, see Japanese Laid-Open Patent Publication No. 62-90863.

SUMMARY OF THE INVENTION

The non-aqueous secondary battery of this invention comprises a positive electrode; a negative electrode containing lithium, and a non-aqueous ion-conductive material, wherein the positive electrode contains $Li_xCo_{1-y}Sb_yO_2$, where $0.05 \leq x \leq 1.1$, and $0.001 \leq y \leq 0.10$ as a positive electrode active material. The negative electrode is made of lithium, a lithium alloy, a material capable of insertion and desertion of lithium or a material capable of intercalating and deintercalating lithium ions.

Thus, the invention described herein makes possible the advantage of providing a high voltage non-aqueous secondary battery using a novel positive electrode active material $Li_xCo_{1-y}Sb_yO_2$, in which the polarization during charge and discharge is decreased, and charge is conducted at a voltage less than that at which a solvent is decomposed, whereby charge and discharge capacity is increased.

This and other advantages of the present invention will become apparent to those skilled in the art upon reading and understanding the following detailed description with reference to the accompanying figures.

DETAILED DESCRIPTION OF THE INVENTION

Figure 1:
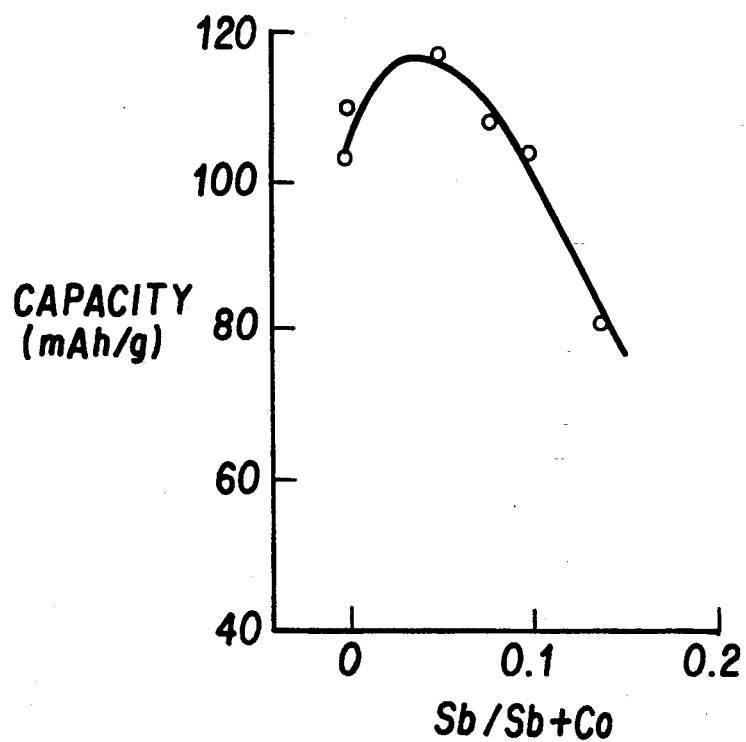
FIG. 1 is a graph showing the relationship between the charge and discharge capacity per 1 g of positive electrode active material and the composition ratio y of an antimony atom in Examples 1–4 and Comparative Examples 1–2 of the present invention.

According to the present invention, a non-aqueous secondary battery which comprises a positive electrode, a negative electrode containing lithium, and a non-aqueous ion-conductive material, wherein the positive electrode contains $Li_xCo_{1-y}Sb_yO_2$, where $0.05 \leq x \leq 1.1$, $0.001 \leq y \leq 0.10$, as a positive electrode active material is provided. The negative electrode is made of lithium, an alloy of lithium, or a material capable of intercalating and deintercalating lithium ions.

For the preparation of a novel positive electrode active material $Li_xCo_{1-y}Sb_yO_2$ used in the present invention, a lithium compound, a cobalt compound, and an antimony compound are mixed, and then sintered in the air or in an atmosphere of oxygen at a temperature ranging from 700° C. to 1000° C. These compounds are oxides, hydroxides, carbonates, or nitrates; or organic acid salts such as oxalates or acetates; and the like of lithium, cobalt or antimony. Alternatively, after these compounds are dissolved or suspended in a solvent such as water or acetnitrile, a mixed material obtained by removing the solvent by heating and the like, or crystallization by cooling, or precipitation by adding other solvent is heated in the air or in an atmosphere of oxygen at a temperature ranging from 700° C. to 1000° C., whereby a positive electrode active material used in the present invention can be obtained. A value x of an Li composition of the obtained active material is in the range of $0.85 \leq x \leq 1.1$, and is varied in the range of $0.05 \leq x \leq 1.1$ by charge and discharge processes.

The positive electrode used in the battery of the present invention contains a mixture of a conductive material, a binder, and if necessary, a solid electrolyte or the like, and $Li_xCo_{1-y}Sb_yO_2$ as a positive electrode active material. Five to fifty parts by weight of conductive material and 1 to 30 parts by weight of binder are used based on 100 parts by weight of the active material. Examples of the conductive material include carbons such as acetylene black and the like, graphite powders, and metal powders. Examples of the binder include fluorinated polymers such as poly-tetrafluoroethylene, poly-fluorovinylidene and the like, and polyolefin type polymers such as polyethylene, polypropylene, and the like.

Examples of the ion-conductive material of the present invention include an organic electrolyte solution, a polymeric solid electrolyte, an inorganic solid electrolyte, a molten salt, and the like. In particular, the organic electrolyte solution is preferred. Examples of a solvent for the organic electrolyte solution include esters such as propylene carbonate, ethylene carbonate, butylene carbonate, diethyl carbonate, methyl ethyl carbonate, γ-butyrolactone, methyl formate, and methyl acetate; tetrahydrofuran and substituted tetrahydrofurans such as 2-methyltetrahydrofuran; ethers such as dioxolane, diethyl ether, dimethoxyethane, diethoxyethane, and methoxyethoxyethane; dimethyl sulfoxide; sulfolane, methylsulfolane; acetonitrile; and the like. These solvents can be used alone or a mixture of two or more of these solvents can be used. Examples of a salt contained in the organic electrolyte solution include lithium salts such as lithium perchlorate, lithium fluoroborate, lithium fluorophosphate, lithium hexafluoroarsenate, lithium trifluoromethanesulfonate, lithium halides, lithium chloroalminate, and the like. These salts can be used alone or a mixture of two or more of these salts can be used.

As the negative electrode of the present invention, lithium; a lithium alloy such as a lithium aluminum and the like; a material capable of insertion and desertion of lithium or intercalating and deintercalating lithium ions, e.g., conductive polymers (polyacetylene, polythiophene, polyparaphenylene, and the like); pyrolytic carbon; graphite; carbon obtained by sintering pitch, coke, tar, or the like; carbon obtained by sintering polymers such as cellulose, phenol resin, and the like; inorganic compounds ($WO_2$, $MoO_2$, and the like) capable of insertion and desertion of lithium can be used alone or complexes thereof can be used.

According to the present invention, the polarization and potential of the positive electrode are decreased and the charge and discharge capacity of the non-aqueous secondary battery is increased by using $Li_xCo_{1-y}Sb_yO_2$ ($0.05 \leq x \leq 1.1$, $0.001 \leq y \leq 0.10$) as the positive electrode active material. Though not intended to be bound by any theory, the reasons for this increase of capacity are considered to be as follows:

When Sb is added to $LiCoO_2$, the Sb is incorporated into the $LiCoO_2$ crystal, or $LiSbO_2$ and $LiCoO_2$ are appropriately mixed at an atomic level, leading to increased electric conductivity; as a result, the diffusion rate of lithium ions in the crystal is increased and the polarization during the charge and discharge processes is decreased, whereby the charge and discharge capacity is improved.

The Li component x is varied during the charge and discharge processes in the range of $0.05 \leq x \leq 1.1$. When the lithium ions are deintercalated from the positive electrode during the charge process, the composition x becomes 0.05. When the lithium ions are intercalated into the positive electrode during discharge or after synthesis of the positive electrode active material, the composition x becomes 1.1.

The Sb component y is in the range of $0.001 \leq y \leq 0.10$. The lowest value of y is a threshold value at which the effects of Sb addition can be recognized. When the component y becomes 0.10 or more, the effects of Sb addition cannot be recognized, and the addition of Sb has adverse effects on the capacity of the battery, resulting in poor capacity during charge and discharge processes.

EXAMPLES

Hereinafter, the present invention will be described in detail by way of illustrating examples with reference to the drawings. The examples are not intended to limit the scope of the present invention.

EXAMPLE 1

Formation of a Positive Electrode

First, lithium carbonate, cobalt carbonate, and antimony trioxide were weighed in a proportion to produce a lithium:cobalt:antimony atomic ratio of 1:0.95:0.05. These materials were mixed in a mortar and sintered in the air at 900° C. for 20 hours. The mixture was ground in the mortar to obtain powders of a positive electrode active material. The positive electrode active material thus obtained was an oxide having a composition of $Li_{0.98}Co_{0.95}Sb_{0.05}O_2$.

The positive electrode active material was mixed with acetylene black and polytetrafluoroethylene in a ratio of 100:10:5, respectively, and then the mixture was formed into a pellet with a diameter of 20 mm and a weight of 0.25 g.

Fabrication of a Battery

Figure 2:
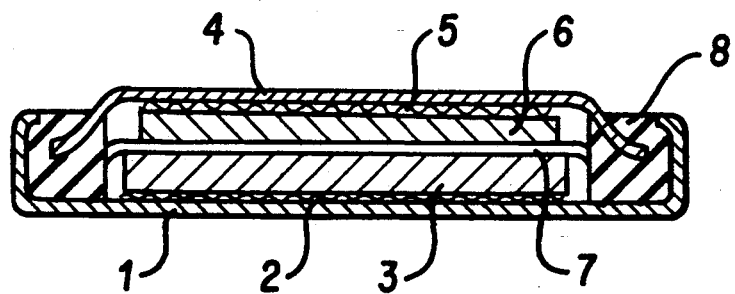
FIG. 2 is a cross-sectional view schematically showing an example of a structure of a non-aqueous secondary battery of the present invention.

As shown in FIG. 2, a positive electrode 3 was bonded by pressure to a current collector for a positive electrode 2 which was previously welded onto an internal surface of a positive case 1 provided with an insulating packing 8. Then, a separator 7 made of polypropylene nonwoven fabric was disposed on the positive electrode 3, and was impregnated with a propylene carbonate solution of 1 mol/l of lithium perchloride as an ion-conductive material. Separately, a current collector 5 for a negative electrode was welded onto an internal surface of a negative cap 4, and as a negative electrode 6, lithium metal was bonded by pressure to the current collector 5 for a negative electrode. The above-mentioned negative cap 4 with the current collector 5 and the negative electrode 6 were layered on the positive case 1 with the positive electrode 3 and the separator 7 so that the negative electrode 6 was in contact with the separator 7. Then, the positive case 1 and the negative cap 4 were sealed with the insulating packing 8 to fabricate a coin shape battery.

Evaluation of a Battery

The battery thus produced was charged with a current of 1 mA to an upper limit voltage of 4.2 V. After the voltage reached the upper limit thereof, the battery was charged for 12 hours at a constant voltage of 4.2 V.

Then, the battery was discharged with a current of 1 mA to a lower limit voltage of 3.7 V, and evaluated for the capacity thereof. The battery was evaluated by a discharge capacity per 1 g of positive electrode active material. The result is shown in Table 1 and FIG. 1.

EXAMPLE 2

A coin shape battery was fabricated and evaluated in the same way as in Example 1, except that the atomic ratio of the positive electrode active material was 1.07:0.997:0.003 (Li:Co:Sb) and sintered at 750° C. In this case, the positive electrode active material was an oxide having a composition of $Li_{1.04}Co_{0.997}Sb_{0.003}O_2$. The discharge capacity per 1 g of positive electrode active material is shown in Table 1 and FIG. 1.

EXAMPLE 3

A coin shape battery was fabricated and evaluated in the same way as in Example 1, except for the following.

As a positive electrode active material, lithium acetate, cobalt acetate, and antimony acetate were weighed in a proportion to produce a Li:Co:Sb atomic ratio of 1.03:0.92:0.08, and were dissolved in water at 90° C., and the mixture was pre-sintered at 300° C. for 30 hours and sintered at 950° C. for 5 hours.

In this case, the positive electrode active material was an oxide having a composition of $Li_{1.02}Co_{0.92}Sb_{0.08}O_2$. The discharge capacity per 1 g of positive electrode active material is shown in Table 1 and FIG. 1.

EXAMPLE 4

A coin shape battery was fabricated and evaluated in the same way as in Example 1, except for the following.

As a positive electrode active material, lithium acetate, cobalt acetate, and antimony acetate were weighed in a proportion to produce a Li:Co:Sb atomic ratio of 1.01:0.90:0.10, and were dissolved in water. Then, a mixture was obtained by evaporating the water at 90° C., and the mixture was pre-sintered at 300° C. for 30 hours and sintered at 950° C. for 5 hours.

In this case, the positive electrode active material was an oxide having a composition of $Li_{1.00}Co_{0.90}Sb_{0.10}O_2$. The discharge capacity per 1 g of positive electrode active material is shown in Table 1 and FIG. 1.

COMPARATIVE EXAMPLE 1

A coin shape battery was fabricated and evaluated in the same way as in Example 1, except that as a positive electrode active material, lithium carbonate and cobalt carbonate were weighed in a proportion to produce a Li:Co atomic ratio of 1.03:1.0 and an active material containing no antimony was prepared. In this case, the positive electrode active material was an oxide having a composition of $Li_{1.01}CoO_2$. The discharge capacity per 1 g of positive electrode active material is shown in Table 1 and FIG. 1.

COMPARATIVE EXAMPLE 2

A coin shape battery was fabricated and evaluated in the same way as in Example 1, except that as a positive electrode active material, lithium carbonate, cobalt carbonate, and antimony trioxide were weighed in a proportion to produce a Li:Co:Sb atomic ratio of 1.05:0.86:0.14. In this case, the positive electrode active material was an oxide having a composition of $Li_{1.03}Co_{0.86}Sb_{0.14}O_2$. The discharge capacity per 1 g of positive electrode active material is shown in Table 1 and FIG. 1.

COMPARATIVE EXAMPLE 3

A coin shape battery was fabricated and evaluated in the same way as in Example 1, except that as a positive electrode active material, lithium carbonate, cobalt carbonate, and antimony trioxide were weighed in a proportion to produce a Li:Co:Sb atomic ratio of 1.15:0.95:0.05. In this case, the positive electrode active material was an oxide having a composition of $Li_{1.13}Co_{0.95}Sb_{0.05}O_2$. The discharge capacity per 1 g of positive electrode active material is shown in Table 1.

TABLE 1

| | discharge capacity per 1 g of positive electrode material |
|---|---|
| Example 1 | 117 mAh/g |
| Example 2 | 110 mAh/g |
| Example 3 | 108 mAh/g |
| Example 4 | 105 mAh/g |
| Comparative Example 1 | 103 mAh/g |
| Comparative Example 2 | 81 mAh/g |
| Comparative Example 3 | 102 mAh/g |

From the above results, it was found that when the values x and y of $Li_xCo_{1-y}Sb_yO_2$ are in the range of $0.05 \leq x \leq 1.1$ and $0.001 \leq y \leq 0.10$, the capacity was increased compared with that in the case of $LiCoO_2$.

EXAMPLE 5

A positive electrode produced in the same way as in Example 1 was used. A negative electrode prepared by the following process was used. Propane was used as a starting material, and was thermally decomposed and deposited on a Ni substrate at 1000° C. for 10 hours, whereby carbon was disposed on the substrate. The deposited carbon was removed from the substrate and ground in a mortar to obtain powders. The powders and polyolefin were mixed in a weight ratio of 100:15. The mixture was formed by pressure to obtain a pellet as a negative electrode with a diameter of 20 mm and a weight of 0.2 g. A battery was fabricated in the same way as in Example 1 by using the positive electrode, negative electrode, and an electrolyte solution of propylene carbonate containing 1 mol/l of lithium perchloride. The battery thus fabricated was charged with a current of 1 mA to an upper limit voltage of 4.0 V. After the voltage reached an upper limit voltage, the battery was charged for 12 hours at a constant voltage of 4.0 V. Then, the battery was discharged to a lower limit voltage of 3.4 V and evaluated for its capacity. The battery thus obtained had a discharge capacity of 112 mAh per 1 g of positive electrode active material. This battery had improved capacity, compared with that obtained in Comparative Example 1.

From the above results, it was confirmed that the material capable of intercalating and deintercalating Li-ion can also be utilized as the negative electrode.

EXAMPLE 6

A battery was fabricated using the positive electrode and the negative electrode produced in the same way as in Example 5, and an electrolyte solution of a mixed solution of diethyl carbonate and ethylene carbonate containing 1 mol/l of lithium fluorophosphate. The battery thus obtained was evaluated in the same way as in Example 5. This battery had a discharge capacity of 121 mAh per 1 g of positive electrode active material, which was improved compared with that obtained in Comparative Example 1.

From the above results, it was found that the battery of this invention can be improved by changing the solvent of the electrolyte solution. This improvement obtained by changing propylene carbonate to the mixed carbonates may be attributed to their ease of entering into the electrode or to their high conductivity.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A non-aqueous secondary battery comprising:
a positive electrode;
a negative electrode containing lithium, and
a non-aqueous ion-conductive material,
wherein said positive electrode contains a mixture of a conductive material, a binder and a positive electrode active material represented by $Li_xCo_{1-y}Sb_yO_2$, where $0.05 \leq x \leq 1.1$, and $0.001 \leq y \leq 0.10$, 5 to 50 parts by weight of said conductive material and 1 to 30 parts by weight of said binder being used based on 100 parts by weight of said active material.

2. A non-aqueous secondary battery according to claim 1, wherein said negative electrode is made of lithium, a lithium alloy, a material capable of insertion and desertion of lithium or a material capable of intercalating and deintercalating lithium ions.

3. A non-aqueous secondary battery according to claim 1, wherein said ion-conductive material contains at least one solvent selected from the group consisting of propylene carbonate, ethylene carbonate, butylene carbonate, diethyl carbonate, methyl ethyl carbonate, γ-butyrolactone, methyl formate, methyl acetate, tetrahydrofuran, 2-methyltetrahydrofuran, dioxolane, diethyl ether, dimethoxyethane, diethoxyethane, methoxyethoxyethane, dimethyl sulfoxide, sulfolane, methylsulfolane, and acetonitrile.

* * * * *

UNITED STATES PATENT AND TRADEMARK OFFICE
CERTIFICATE OF CORRECTION

PATENT NO. : 5,407,762
DATED : April 18, 1995
INVENTOR(S) : T. MITATE et al

It is certified that error appears in the above-identified patent and that said letters patent is hereby corrected as shown below:

Column 5, lines 20-25, the second paragraph of Example 3 should read as follows:

--As a positive electrode active material, lithium acetate, cobalt acetate, and antimony acetate were weighed in a proportion to produce a Li:Co:Sb atomic ratio of 1.03:092:0.08, and were dissolved in water. Then, a mixture was obtained by evaporating the water at 90°C., and the mixture was pre-sintered at 300°C. for 30 hours and sintered at 950°C. for 5 hours.--

Signed and Sealed this

Eighteenth Day of July, 1995

Attest:

BRUCE LEHMAN

*Attesting Officer*           *Commissioner of Patents and Trademarks*